June 23, 1959

J. S. BALL 2,891,685

ROTARY FEEDERS FOR POSITIVE PRESSURE
PNEUMATIC CONVEYOR SYSTEMS

Filed Aug. 9, 1956

Inventor
J. S. Ball
By [signature]
Attys.

June 23, 1959
J. S. BALL
2,891,685
ROTARY FEEDERS FOR POSITIVE PRESSURE
PNEUMATIC CONVEYOR SYSTEMS
Filed Aug. 9, 1956
2 Sheets-Sheet 2
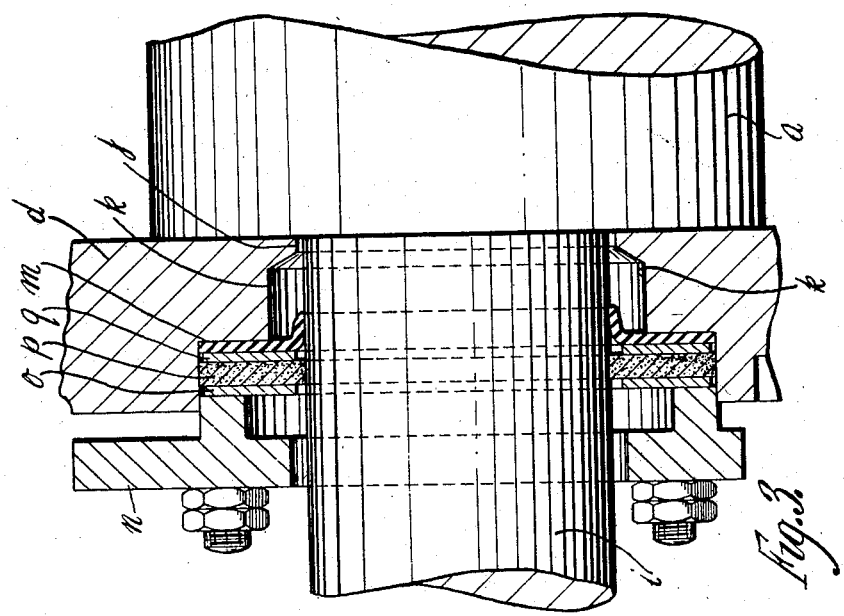
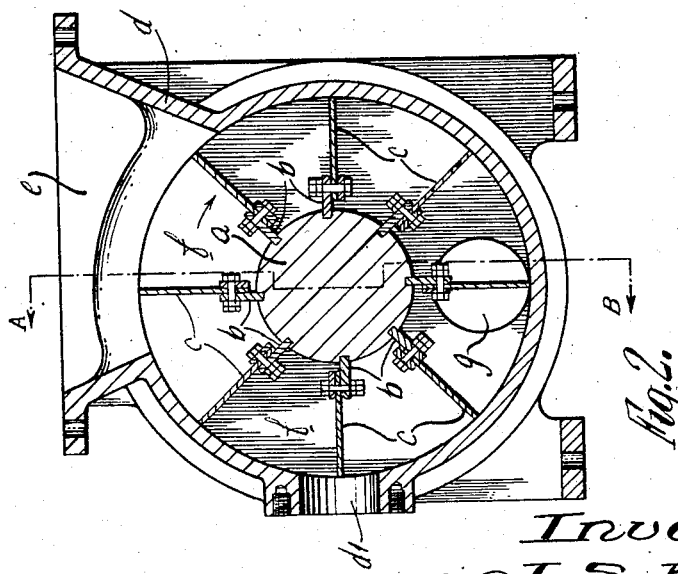
Inventor
J. S. Ball

United States Patent Office 2,891,685
Patented June 23, 1959

2,891,685

ROTARY FEEDERS FOR POSITIVE PRESSURE PNEUMATIC CONVEYOR SYSTEMS

John Stephen Ball, Woodsmoor, Stockport, England, assignor to Henry Simon Limited, Stockport, England, a British company Application August 9, 1956, Serial No. 602,954

Claims priority, application Great Britain September 19, 1955

3 Claims. (Cl. 214—17)

This invention relates to rotary feeders as used in positive pressure pneumatic conveying equipment for the transference of pulverulent material from hoppers, separators or processing machines to ducts along which the material is to be conveyed pneumatically and is particularly directed to the sealing means whereby pressure loss at rotor shaft seal housings is prevented.

In rotary feeders, rotor shaft housing pressure retaining seals of various types suitable for internal pressure retention during the feeding of most types of pulverulent materials are well known but there is a group of such materials, for instance sugar or Portland cement, which when in contact with the sliding surfaces of relatively moving elements cause considerable increase in the friction generated at such surfaces, giving rise in the case of rotary feeders, where operational pressure tends to force the material into the sealing means, to rapid deterioration, seizure and destruction of said known types of pressure retaining seals and consequent pressure loss and material leakage from the system.

The object of the present invention is to provide in positive pressure pneumatic conveying equipment for the conveyance of sugar, Portland cement and like materials, rotary feeders having at each rotor-shaft-seal-housing, an improved form of sealing means which will avoid the above disadvantages.

The invention consists in a rotary feeder for pneumatic pressure conveying equipment in which the ends of the rotor shaft pass through sealing means in the end walls of the rotor casing, each end wall having therein beyond the aperture through which the shaft passes a recess or cavity into which material which may pass through said aperture can accumulate, the wall of the recess or cavity opposite to the apertured wall comprising a resilient washer having a part thereof which surrounds and extends axially along the shaft into the recess or cavity, so that such material will press upon said part and ensure its intimate sealing contact with the shaft. There may be beyond each resilient washer, a sealing washer to prevent the ingress from exterior sources of oil, water or other liquid or solid material which could adversely affect the sealing function of the resilient washer, the said sealing washer being protected from the material in the cavity by the action of the resilient washer.

The invention further consists in a rotary feeder as aforesaid in which the resilient washer which forms a wall, of each recess or cavity around the shaft comprises a part of cylindrical shape which extends co-axially along and in sealing contact with the shaft and a part of radial disc like form which is clamped to the end wall by an assembly comprising a gland plate, a metal ring, a sealing washer which makes intimate contact with the shaft, and a further metal ring, the assembly being secured in place by bolts and nuts.

Referring to the accompanying explanatory drawings:

Figure 3 is a detail sectional view drawn to a larger scale than Figure 1 showing one of the retaining seals for the rotor shaft.

Figure 1:
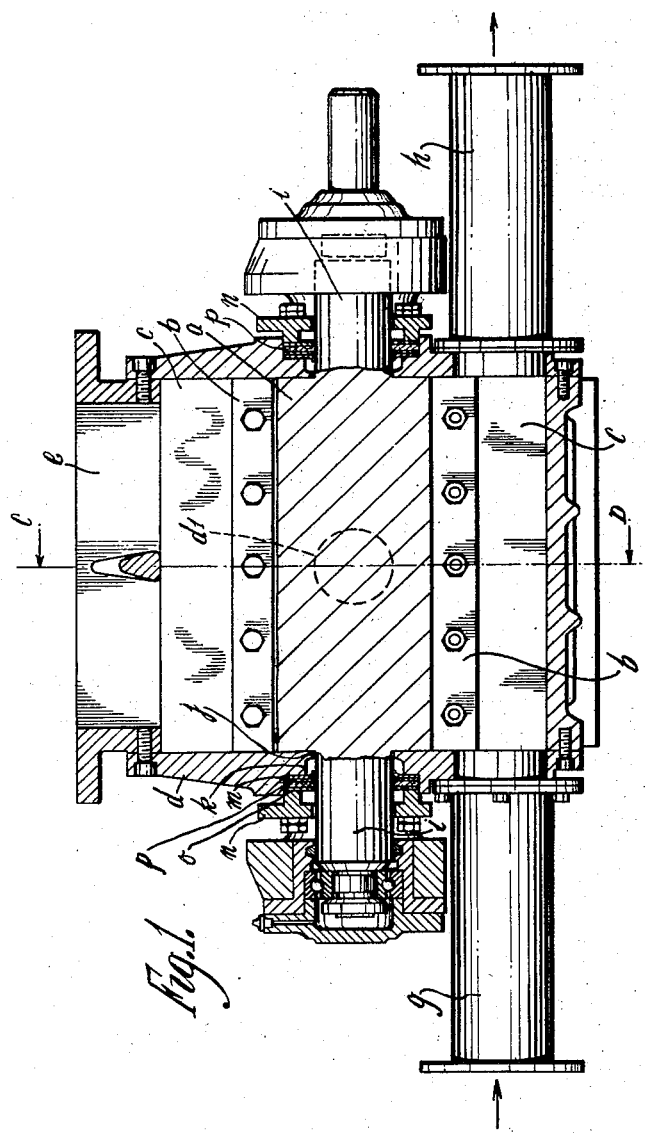
Figure 1 is a longitudinal sectional elevation on the line A B of Figure 2 and Figure 2 a cross sectional view on the line C D of Figure 1 showing a rotary feeder with retaining seals for the rotor shaft constructed in one convenient form in accordance with this invention.

The rotor comprises a shaft $a$ having strips $b$ secured in longitudinal slots in the shaft and flexible blades $c$ secured to the strips $b$. The rotor revolves in a casing $d$ which has an inlet branch at $e$ for the material to be delivered by the rotor. There are pockets $f$ between the blades $c$ and such pockets carry the material from the inlet branch at $e$ to the lower portion of the casing $d$, when the pockets in succession come into alignment with inlet and outlet branches $g$ and $h$ respectively, the branch $g$ introducing compressed air to the pockets in succession which blows the contents of the pockets into the branch $h$ which is connected to the conveying system.

The aperture $d^1$ in the casing is for releasing the air pressure in each pocket before it arrives at the filling position beneath the feed branch $e$.

The rotor shaft ends $i$ pass through co-axial holes $j$ in the walls of the casing, these holes leaving a generous clearance around the shaft. The walls are relatively thin and tapered at the said holes $j$ and the holes lead to co-axial recesses or cavities $k$ in the walls around the shaft. The wall of each recess or cavity $j$ opposite to that containing the hole $j$ is provided by a resilient washer $m$ made of leather or like material having a tubular part which extends co-axially around the shaft and a part which extends radially around the shaft. The tubular part makes intimate contact with the shaft and the complete washer is held in place by an assembly, comprising a gland plate $n$, a metal ring $o$, a resilient compressed washer $p$ which may be made of felt and which makes intimate contact with the surface of the shaft end $i$, and a further metal ring $q$. The assembly is secured in place by bolts and nuts in the usual manner.

In operation, a small quantity of the material passes from the pockets between the blades $c$ through the holes $j$ around the shaft ends $i$ into the recesses or cavities $k$, which results in the production in each recess or cavity of a ring of the material which presses upon the part of the washer $m$ which surrounds and makes intimate contact with the shaft and ensures that such part of the washer makes sealing contact with the shaft and effectively prevents infiltration of such material into the felt or like washer $p$ and the cylindrical surface of such washer $p$ around the shaft.

The material in each cavity $k$ in addition to holding the part of the washer $m$ which is coaxially around the shaft in intimate contact with the latter also provides for the washer $m$ a protective barrier due to the fact that the material in contact with the stationary walls of the cavity adheres firmly thereto and the material in contact with the rotating shaft $i$ adheres to the surface thereof and rotates with it, inducing within the rest of the material in the cavity a confused particle motion and providing a resistance to the ingress of additional material to the cavity, thus protecting the washer $m$ from the effects of undue pressure. Such material remains confined in the recess or cavity and does not change.

What I claim is:

1. In a rotary feeder of the type described, including a rotor shaft extending through an aperture in an end wall of the feeder, the improvement comprising said aperture being of a size to provide generous clearance between said end wall and said shaft to avoid abrasive action between said wall and shaft, an annular cavity about said shaft beyond said aperture in which material passing through said aperture may accumulate, the wall of said cavity opposite said aperture comprising a resilient washer having a part thereof which surrounds and closely fits said shaft and extends axially therealong into said cavity, so that material accumulating in said cavity will press upon said part of said resilient washer that extends axially along said shaft to ensure its intimate sealing contact with the shaft.

2. In a rotary feeder as claimed in claim 1, the provision beyond each resilient washer of a sealing washer which makes intimate contact with the shaft and is protected from the material by the action of said resilient washer.

3. A rotary feeder as claimed in claim 1, in which the resilient washer which forms a wall of the cavity around the shaft comprises a part of cylindrical shape which extends coaxially along and in sealing contact with the shaft and a part of radial disc form which is clamped to the end wall by an assembly, comprising a gland plate, a metal ring, a sealing washer which makes intimate contact with the shaft and a further metal ring, the assembly being secured in place by bolts and nuts.

References Cited in the file of this patent

UNITED STATES PATENTS

| | | |
|---|---|---|
| 1,729,032 | Cross | Sept. 24, 1929 |
| 1,947,210 | McCrery | Feb. 3, 1934 |
| 2,011,133 | Yoss | Aug. 13, 1935 |
| 2,428,995 | Rogers | Oct. 14, 1947 |

FOREIGN PATENTS

| | | |
|---|---|---|
| 726,233 | Great Britain | Mar. 16, 1955 |